(12) United States Patent
Shivarama et al.

(10) Patent No.: US 10,395,679 B2
(45) Date of Patent: Aug. 27, 2019

(54) TRANSDUCING HEAD SUSPENSION WITH RESONANCE SYSTEM

(71) Applicant: Seagate Technology, LLC, Cupertino, CA (US)

(72) Inventors: Ravishankar Ajjanagadde Shivarama, Eden Prairie, MN (US); Bradley J. Ver Meer, Savage, MN (US); Razman Zambri, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/836,151

(22) Filed: Dec. 8, 2017

(65) Prior Publication Data

US 2019/0180777 A1 Jun. 13, 2019

(51) Int. Cl.
G11B 5/48 (2006.01)
G11B 5/31 (2006.01)

(52) U.S. Cl.
CPC ............ *G11B 5/484* (2013.01); *G11B 5/3163* (2013.01); *G11B 5/4826* (2013.01); *G11B 5/4833* (2013.01)

(58) Field of Classification Search
CPC ............................ G11B 5/4826; G11B 5/4833
USPC .................................. 360/245, 245.1, 245.4
See application file for complete search history.

(56) References Cited

U.S. PATENT DOCUMENTS

| | | | |
|---|---|---|---|
| 5,115,363 A | 5/1992 | Khan et al. | |
| 5,313,353 A | 5/1994 | Kohso et al. | |
| 5,367,419 A | 11/1994 | Kazama | |
| 5,636,089 A * | 6/1997 | Jurgenson | G11B 5/4826 360/245.1 |
| 5,666,241 A * | 9/1997 | Summers | G11B 5/4833 360/245.1 |
| 5,835,307 A | 11/1998 | Sone | |
| 5,991,122 A | 11/1999 | Tangren et al. | |
| 6,191,915 B1 * | 2/2001 | Takagi | G11B 5/4826 360/245.7 |
| 6,493,192 B2 | 12/2002 | Crane et al. | |
| 6,560,852 B2 | 5/2003 | Liem et al. | |
| 7,787,217 B2 | 8/2010 | Mangold et al. | |
| 8,213,122 B1 | 7/2012 | Lowry | |
| 8,351,159 B2 * | 1/2013 | Hirano | G11B 5/4826 360/244.1 |
| 8,493,689 B2 * | 7/2013 | Virmani | G11B 5/4853 360/245 |
| 2001/0012182 A1 * | 8/2001 | Boutaghou | G11B 5/4853 360/245.7 |
| 2004/0190203 A1 * | 9/2004 | Albrecht | G11B 5/4826 360/246.1 |
| 2005/0275972 A1 * | 12/2005 | Takahashi | G11B 5/4826 360/245.1 |

(Continued)

*Primary Examiner* — Jefferson A Evans
(74) *Attorney, Agent, or Firm* — Hall Estill Attorneys at Law

(57) ABSTRACT

A data storage system can employ at least one transducing head that is suspended above a data storage medium to access data. The transducing head suspension can be configured with a resonance system where a gimbal flexure is mounted to a load beam via a physical connection. The gimbal flexure may support a transducing head and contact the load beam via the physical connection, a dimple, and a first contact feature concurrently while the physical connection, dimple, and first contact feature are each separate and different points of physical contact.

20 Claims, 4 Drawing Sheets

(56) References Cited

U.S. PATENT DOCUMENTS

2007/0159726 A1* 7/2007 Maslov ................ G11B 5/4826
                                                                                 360/245.1
2007/0188927 A1* 8/2007 Zhu ...................... G11B 5/4826
                                                                                 360/245.3

\* cited by examiner

TRANSDUCING HEAD SUSPENSION WITH RESONANCE SYSTEM

SUMMARY OF THE INVENTION

A data storage system, in accordance with some embodiments, has a transducing head suspension with a resonance system where a load beam is mounted to a gimbal flexure via a physical connection. The gimbal flexure supports a transducing head and contacts the load beam via the physical connection, a dimple, and a first contact feature concurrently while the physical connection, dimple, and first contact feature are each separate and different points of physical contact.

Various embodiments configure a transducing head suspension with a resonance system where a load beam is mounted to a gimbal flexure via a physical connection. The gimbal flexure supports a transducing head and contacts the load beam via the physical connection, a dimple, and a first contact feature concurrently while the physical connection, dimple, and first contact feature are each separate and different points of physical contact. The gimbal flexure has a first compromising feature that weakens the gimbal flexure to increase a first order resonance frequency of the gimbal flexure.

In other embodiments, a gimbal flexure is mounted to a load beam via a physical connection with the gimbal flexure supporting a transducing head. Contact of the load beam is made with the gimbal flexure via the physical connection, a dimple, and a first contact feature concurrently. The physical connection, dimple, and contact feature are each separate and different points of physical contact. Data is accessed on a data storage medium adjacent to the transducing head while the load beam contacts the gimbal flexure with each of the physical connection, dimple, and contact feature to increase a first order resonance frequency of the gimbal flexure.

DETAILED DESCRIPTION

Progression of data storage systems towards higher data capacity has emphasized the physical stability of any moving components. Tighter movement and vibration tolerances can result in more areal data capacity on a data storage medium, but can also result in increased susceptibility to operational variations. For instance, encountered vibrations during operation can reach resonance of some, or all, of a transducing head suspension and cause errors and failures. Hence, there is a concerted interest in decreasing the susceptibility of a data storage system to operational variations, particularly vibrations experienced by transducing head suspensions.

Accordingly, various embodiments of this disclosure are generally directed to tuning a transducing head suspension to provide vibration resonance characteristics that are less likely to occur during data access operations. The ability to position and shape any number of contact and compromising features in a transducing head suspension can maintain contact between a load beam and gimbal flexure during operation, which increases the resonance frequency of the gimbal flexure and minimizes mode gain and frequency variability.

Figure 1:
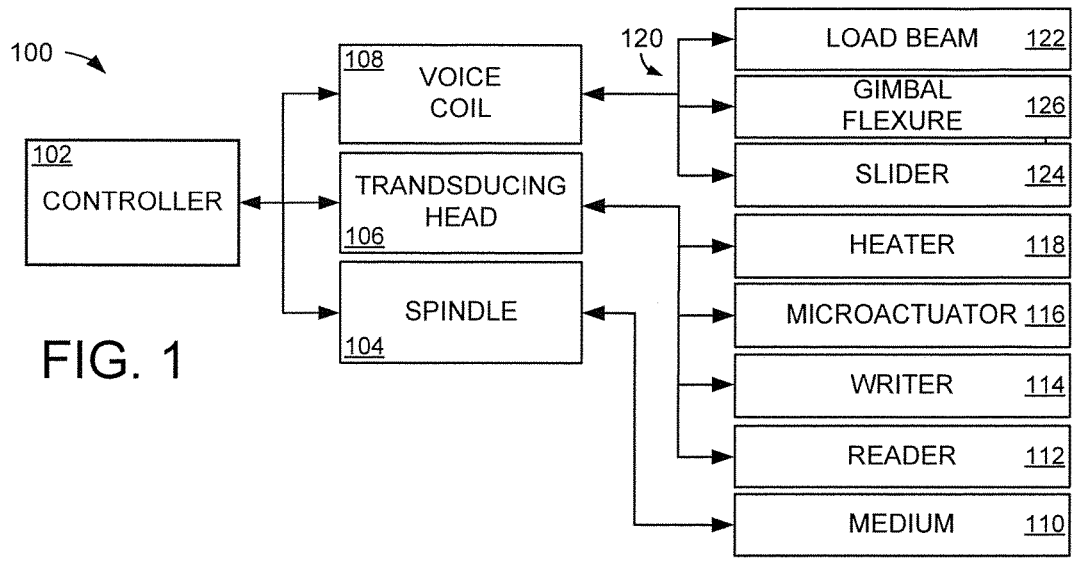
FIG. 1 is a block representation of an example data storage system arranged in accordance with various embodiments.

FIG. 1 is a block representation of an example data storage system 100 arranged in accordance with various embodiments. The data storage system 100 can employ any number and type of data storage device, but is configured with at least one hard disk drive in some embodiments. The hard disk drive 102 has a local controller 102, such as a programmable processor and/or microprocessor, that directs data access operations, such as data reads, data writes, and data maintenance, into, and out of, the drive 102.

The local controller 102 can be connected to at least a spindle motor 104, a transducing head 106, and a voice coil motor 108. The spindle motor 104 physically controls the speed at which one or more magnetic data storage media 110 rotate. The transducing head 106 employs at least a data reader 112 and a data writer 114 that can independently and concurrently operate to magnetically communicate with the data storage media 110. The voice coil motor 108 is arranged to provide coarse physical adjustment of the transducing head 106 relative to the underlying data storage media 110.

Fine physical adjustment of the transducing head 106 can be achieved with one or more microactuators 116 and an articulating heater 118. The local controller 104 selectively activates the various coarse and fine physical adjustments in combination with a transducing suspension 120 to suspend the transducing head 106 a predetermined separation distance above a data storage medium 110. The transducing suspension 120 is arranged with a load beam 122, slider 124, and gimbal flexure 126 to provide enough rigidity that results in physical stability in balance with enough flexibility to adapt to changing environmental and operating conditions to maintain the transducing head 106 is position over selected portions of the data storage medium 110.

The balance of rigidity and flexibility in the transducing suspension 120 can be complicated by the fine physical adjustments of the microactuator 116 and/or heater 118 that can induce vibrations and/or turbulence that jeopardize the positional accuracy of the transducing head 106 relative to the data storage medium 110.

Figure 2A:
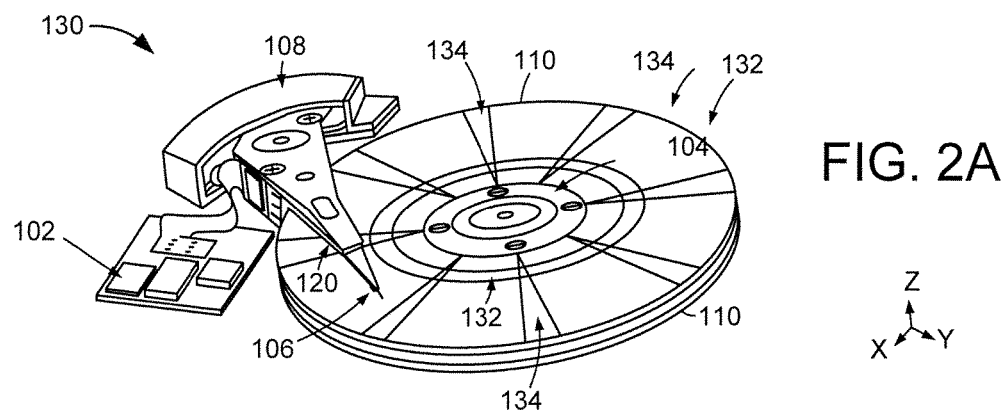
FIGS. 2A and 2B respectively display line representations of portions of an example data storage system configured in accordance with some embodiments.
Figure 2B:
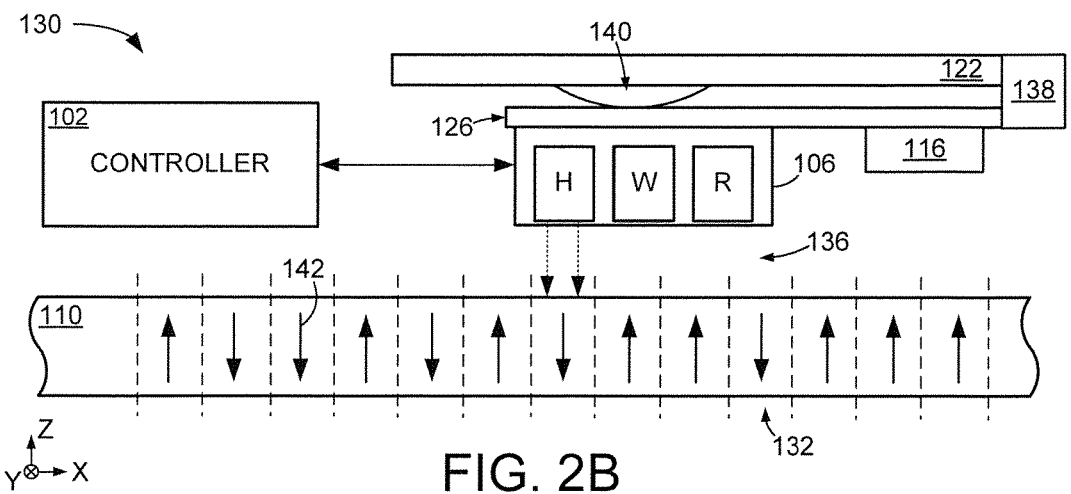

FIGS. 2A and 2B respectively display top and side line representations of portions of an example data storage device 130 that may be utilized in the data storage system 100 of FIG. 1. In FIG. 2A, a data storage medium 110 is shown with a plurality of data tracks 132 that concentrically extend to different radii about the spindle 104. The data tracks 132 are intersected by servo regions 134 where servo data, such as repeated runout correction and encoded gray code, is stored. By articulating the voice coil motor 108 and spindle 104, the local controller 104 can position the transducing head 106, and the attached suspension 120, over a selected data track 132 to program data to, or read data from, the data storage medium 110.

The side view of FIG. 2B displays how the transducing suspension 120 operates to separate the transducing head 106 from the medium 110 by an air bearing 136. The size of the air bearing 136 is selected to provide precise access to a single data track 132 at a time. However, as the angle of the longitudinal axis of the load beam 122 relative to the centerline of the data track 132, which can be characterized as skew angle, changes, the controller 104 can adapt by rotating the transducing head 106 relative to the load beam 122 via the microactuator 116.

Adaptations to changes in the size of the air bearing 136 may also be carried out with the controller 104 selectively activating the heater 118. Although the gimbal flexure 126 can maintain continuous contact with the load beam 122 via a rigid mount 138 and a dimple 140, activation of the microactuator 116 and/or heater 118 can induce vibrations that jeopardize the precision and accuracy of access to the data bits 142 stored in the data storage medium 110.

Figure 3:
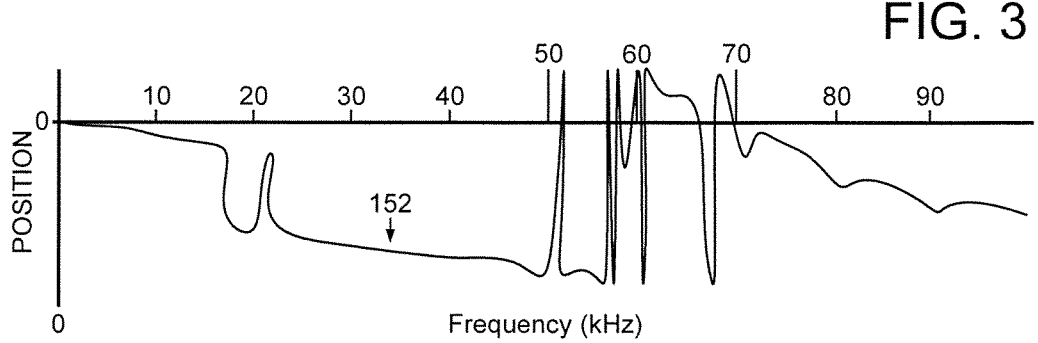
FIG. 3 plots operational data from an example data storage system operated in accordance with assorted embodiments.

FIG. 3 plots vibration data for an example data storage device during data access operations. As shown by solid line 152, the physical position of a transducing head can inadvertently fluctuate when the gimbal flexure reaches a resonance frequency of approximately 68 kHz. The inadvertent fluctuations can be relatively small, or large, and degrade the efficiency and accuracy of data access operations to, or from, a data storage medium. Such fluctuations may alter the data track positioning and/or performance of the air bearing, which results in errors and data writing and reading performance.

With the inadvertent fluctuations caused by first, or higher, order resonance frequencies in the transducing suspension, such as the load beam and gimbal flexure individually or collectively, in mind, various embodiments are directed to maintaining contact between the load beam and gimbal flexure to increase the first order resonance frequency of the collective transducing assembly to above 50 kHz, such as 70-100 kHz, which is above the observed microactuation-induced resonance shown in FIG. 3. However, it is noted that various embodiments are not limited to a particular resonance frequency, or range. As such, a transducing suspension can be tuned to optimize assorted other performance aspects of a transducing suspension, such as changing operating frequencies of a suspension as well as making operating aspects more repeatable in view of changing environmental conditions.

Figure 4A:
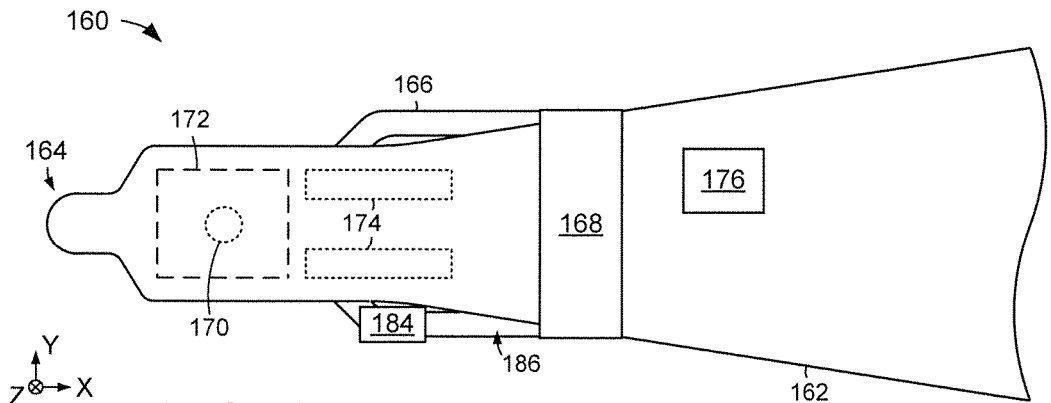
FIGS. 4A and 4B respectively illustrate portions of an example data storage system arranged in accordance with various embodiments.
Figure 4B:
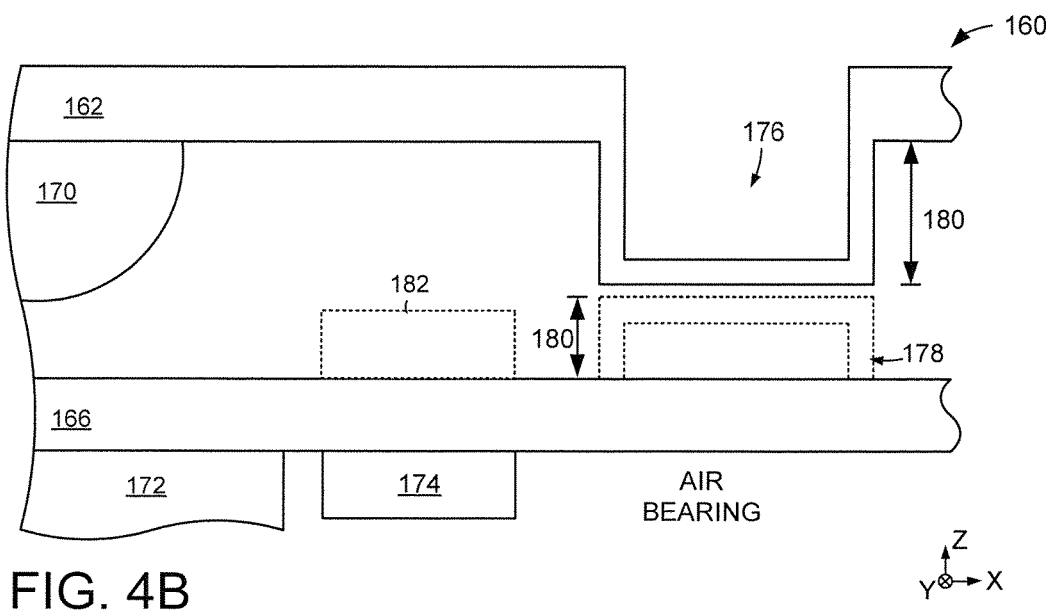

FIGS. 4A and 4B respectively illustrate top and cross-sectional line representations of portions of an example data storage device 160 that can be employed in the data storage systems 100/120 of FIGS. 1, 2A, & 2B. The top view of FIG. 4A shows a transducing suspension 120 with a load beam 162 that is attached to a voice coil assembly (not shown) on a first end and continuously extends to a tab 164. A gimbal flexure 166 is mounted to the load beam 162 via a physical connection 168, which may be a fastener, adhesive, or joint, that provides continuous physical contact between the gimbal flexure 166 and load beam 162.

It is contemplated that the physical connection 168 applies a spring force on the gimbal flexure 166 towards the load beam 162 during operation. It is further contemplated that the gimbal flexure 166 continuously extends from the load beam 162 without being a separate component. Regardless of how the gimbal flexure 166 is affixed to the load beam 162, the gimbal flexure 166 is configured to continuously contact a dimple 170 during operation. That is, the configuration of the gimbal flexure 166, physical connection 168, and load beam 162 ensure continual physical contact of the gimbal flexure 166 with the dimple 170, which provides efficient and precise roll and pitch control while flying above an adjacent data storage medium.

While the continual physical contact of the gimbal flexure 166 and load beam 162 at the physical connection 168 and dimple 170 can provide some stability, the configuration can create resonance modes, such as those shown in FIG. 3, that jeopardize the accuracy and performance of the transducing head 172. Such resonance modes are complicated by the addition of lateral actuation via one or more microactuating features 174, which can be constructed of piezoelectric thin films (PZT) or other electrically responsive material. In other words, the resonance modes and frequencies of the transducing suspension 120 can be altered when microactuating feature(s) 174 are activated to articulate the gimbal flexure 166, and connected transducing head 172, along the X-Y plane.

To increase the plant resonance of the transducing suspension 120 above 50 kHz, one or more contact features 176 are formed in the load beam 162 and/or gimbal flexure 166 to provide at least a third point of continual physical contact between the load beam 162 and gimbal flexure 166. As shown in FIG. 4A, a contact feature 176 can be positioned between the physical connection 168 and the dimple 170, but such configuration is not required or limiting.

The contact feature 176 may be any size, shape, and material that promotes and maintains contact of the load beam 162 and gimbal flexure 166 during data access operations. In the non-limiting example of FIG. 4B, the contact feature 176 continuously extends from the load beam 162 towards the gimbal flexure 166 as a stamped aspect of the load beam 162. Segmented line 178 shows how a contact feature 176 can extend from the gimbal feature 166 towards the load beam 162. In some embodiments, contact features 176 concurrently extend towards each other from the load beam 162 and gimbal flexure 166 with similar, or dissimilar sizes, shapes, and heights 180.

The ability to tune the number, size, shape, position, and originating component of a contact feature 176 allows the resonance modes and frequencies of the transducing suspension 120 to be tuned. For instance, the contact feature(s) 176 can be tuned with respect to the number, type, size, position, and articulating extent of the microactuating feature(s) 174 to provide a transducing suspension 120 first order resonance that is higher than the nominal frequencies encountered by the suspension 120 during data access operations with the microactuating feature(s) being active, or not.

As an example, multiple contact features 176 can be dissimilar shapes, sizes, and heights 180 to raise the first order resonance frequency of the suspension 120 in response to the microactuating feature 174 having multiple separate microacuators that are positioned between the load beam 162 and gimbal flexure 166, as shown by segmented line 182 and opposed to the air bearing side position of the microactuating feature(s) 174 with respect to the gimbal flexure 166 shown by solid line 176. It is noted that the location of the contact features 176/180 in the X-Y plane provides a capability to tune the resonance of the suspension 160.

Although the incorporation of one or more contact features 176 can manipulate the resonance modes and frequency of the transducing suspension 160, the presence of a third continuous point of physical contact between the load beam 162 and gimbal flexure 166 may not provide enough resonance alteration to mitigate the risk of inadvertent movement/vibration during data access operations. Hence, some embodiments configure the gimbal flexure 166 with one or more compromising features 184 that weaken the structural strength and rigidity of the gimbal flexure 166.

It is noted that during suspension fabrication, such as material bending and/or forming, consistent boundary conditions can be lost. Providing weaker features in the gimbal flexure 166 enable a consistent forming line that results in consistent boundary conditions throughout suspension fabrication and assembly.

Incorporating bumps, dimples, protrusions, and/or other features into the suspension 160 can also enable more consistent boundary conditions and data access performance than if the load beam 162 and/or flexure 166 did not have at least one contact feature.

A compromising feature 184 can be characterized as a slot, notch, groove, or stress point that lowers the material strength of the gimbal flexure 166 to allow the concurrent physical contact of the physical connection 168, dimple 170, and contact feature(s) 176 to control the resonance characteristics of the suspension 120. The position of a compromising feature 184 is not limited, but in some embodiments, is placed on one or more flexure struts 186 of the gimbal flexure 166, as shown. The flexure struts 186 provide dynamic lateral stability for the gimbal flexure 166 and the incorporation of one or more compromising features 184 can decrease the resistance of the struts 186 to lateral motion induced by the microactuating feature(s) 176 in the X-Y plane.

Figure 5A:
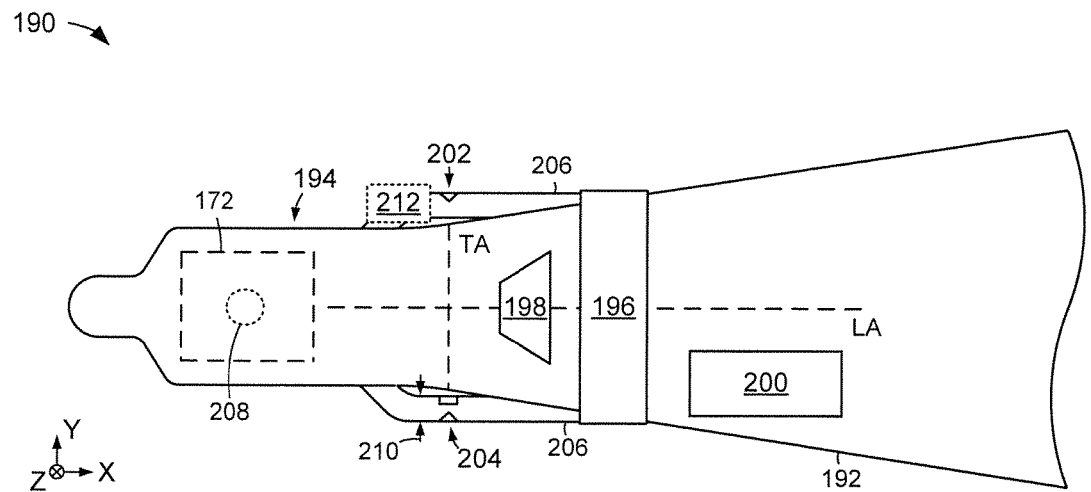
FIGS. 5A and 5B respectively depict portions of an example data storage system operated in accordance with some embodiments.
Figure 5B:
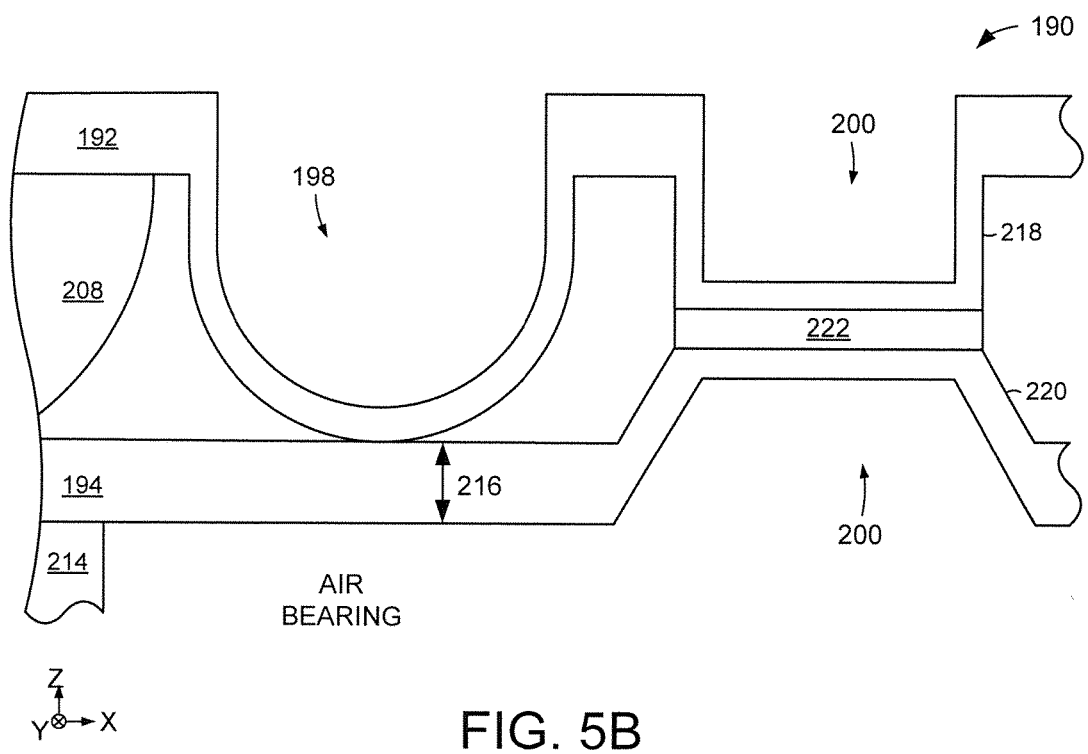

FIGS. 5A and 5B respectively depict top and cross-sectional line representations of portions of an example transducing suspension 190 that can be incorporated in a data storage device and data storage system in accordance with various embodiments. In FIG. 5A, the load beam 192 is affixed to the gimbal flexure 194 via a rigid physical connection 196. The load beam 192 continually contacts the gimbal flexure 194 via first 198 and second 200 contact features that extend from the load beam 192 towards the gimbal flexure 194.

The contact features 198/200 are tuned to operate in concert with first 202 and second 204 compromising features positioned on the flexure struts 206 of the gimbal flexure 194 to increase all resonance modes of the suspension 190 above 50 kHz. While not required or limiting, the first contact feature 198 is symmetrically positioned about the longitudinal axis (LA) of the load beam 192 between the physical connection 196 and the dimple 208. The second contact feature 200 is physically separated from the first contact feature 198 and has a dissimilar configuration, as shown. That is, the second contact feature 200 is offset from the longitudinal axis, such as towards the inner diameter of an adjacent data storage medium, and has a different shape than the first contact feature 198.

It is contemplated that the first 202 and second 204 compromising features are matching and are symmetrically positioned about the longitudinal axis. However, some embodiments arrange the first 202 compromising feature to be different than the second compromising feature 204. In the non-limiting embodiment shown in FIG. 5A, the first compromising feature 202 has a single notch 206 with a substantially V shape that reduces the width 210 of the flexure strut 206 in the X-Y plane while the second compromising feature 204 has two notches, as shown, that are each shaped to reduce the strut width 210 from opposite sides of the strut 206.

It is noted that the position of the respective compromising features 202/204 are aligned along a transverse axis (TA) that is perpendicular to the longitudinal axis of the load beam 192. Such compromising feature alignment is not required and the features 202/204 may be offset from one another with respect to the X axis. It is contemplated that more than one compromising feature can be incorporated into a single flexure strut 206, as illustrated by segmented box 212. The ability to tune the number, position, shape, and size of compromising features on the flexure struts 206 allows for precise tuning of suspension resonance, particularly with the incorporation of microactuators 214 that add lateral rotation to the gimbal flexure 194.

The cross-sectional view of FIG. 5B displays how the first 198 and second 200 contact features can be configured differently to provide continual third and fourth points of load beam/flexure contact in combination with the physical connection 196 and dimple 208. The first contact feature 198 extends from the load beam 192 to contact a uniform thickness 216 (flat) portion of the gimbal flexure 194 while the second contact feature 200 consists of dissimilar contact protrusions 218/220 extending towards one another from the respective load beam 192 and flexure 194.

The combination of differently configured contact features 198/200 can provide reliably consistent points of contact between the load beam 192 and gimbal flexure 194 in response to a variety of different expected and unexpected vibrations and movements that occur during data access operations. For example, the multiple different contact features 198/200 can be arranged so that at least one continual point of contact is present, along with the dimple 208 and physical connection 196, even though the other contact feature may not be in continual contact.

Although not required, one or more contact inserts 222 can be positioned between the load beam 192 and gimbal flexure 194 at a contact feature 198. Such a contact insert 222 can be a rigid, flexible, or semi-rigid material that promotes continual physical contact between the load beam 192 and gimbal flexure 194. The contact insert 222 may be an adhesive or detached component, but in some embodiments, is affixed to one, but not the other, of the load beam 192 and flexure 194. The addition of a contact insert 222 to the area around a contact feature 198/200 can further tune the resonance characteristics of the suspension 190 by providing cushion to absorb abrupt vibrations and movements of the load beam 192 relative to the gimbal flexure 194.

Figure 6:
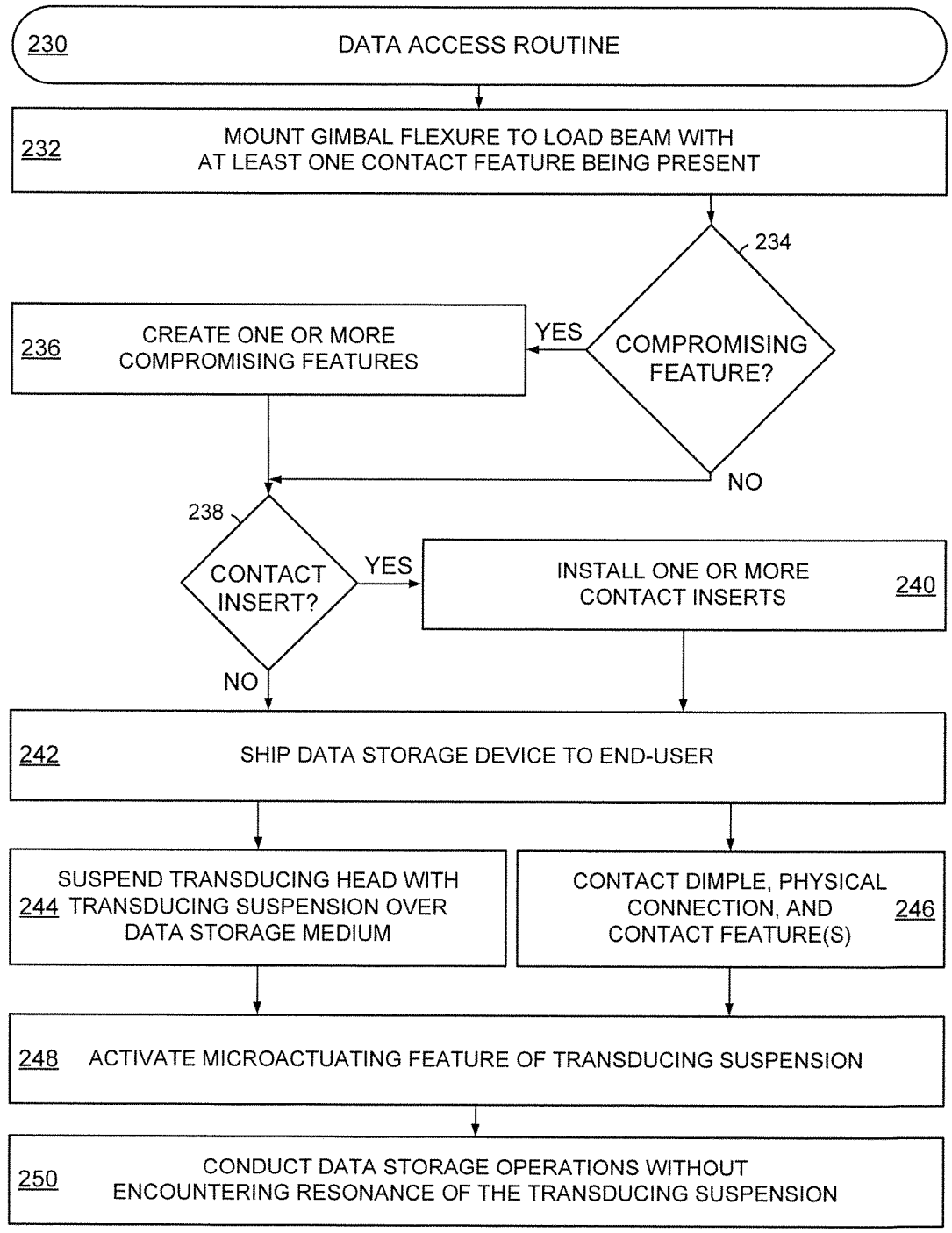
FIG. 6 provides a flowchart of an example data access routine that can be carried out by the data storage systems of FIGS. 1-5B.

FIG. 6 is a flowchart of an example data access routine 230 that can be carried out by the transducing suspensions 120/190 as part of a data storage device and data storage system. Initially, a gimbal flexure is mounted to a load beam in step 232 via a physical connection. The load beam and/or gimbal flexure is step 232 has at least one contact feature incorporated therein. It is contemplated that step 232 is carried out during data storage device manufacturing along with decision 234 that evaluates if a compromising feature is to be utilized. If so, step 236 proceeds to create one or more compromising features that weaken the gimbal strut(s) in a predetermined manner.

After step 236 or in the event no compromising feature is to be used, routine 230 evaluates the inclusion of a contact insert in decision 238. Step 240 is triggered to install one or more contact inserts if decision 238 is affirmatively answered. If no contact insert is to be used, or at the conclusion of installation of the contact insert(s), the data storage device completes manufacturing and is shipped to an end-user in step 242. Next, steps 244 and 246 concurrently suspend the transducing head of at least one transducing suspension above a data storage medium while establishing contact between the load beam and gimbal flexure of the transducing suspension at three separate points (physical connection, dimple, and contact feature(s)).

Step 248 activates a microactuating feature of the transducing suspension, which triggers vibrations and movements to be experienced by the gimbal flexure. With the tuned configuration of the contact feature(s), compromising feature(s), and contact pad(s), the vibrations and movements of step 248 do not reach a resonance mode or frequency of the transducing suspension and step 250 can efficiently and accurately conduct data storage operations on the adjacent data storage medium. It is noted that if resonance had been encountered before, during, or after the microactuation of step 248, the position of the transducing suspension would be in jeopardy and any data access operations conducted in step 250 would be prone to error.

Through the utilization of tuned contact features that promote and maintain physical contact of a load beam and gimbal flexure, the resonance gain and mode of the transducing suspension is altered to provide optimized data access operations, particularly when microactuation occurs. The creation of a more consistent boundary condition between the load beam and gimbal flexure via the contact feature(s), in concert with the concurrent contact via the physical connection and dimple, results in resonance characteristics that reduce the risk of data access errors in view of expected and unexpected vibrations and movement.

The ability to employ any number of compromising features and contact inserts complements the contact features to increase the resonance frequency of the suspension to provide more robust resistance to encountered vibrations. Such tuned resonance characteristics allows the transducing suspension to provide increased bandwidth that is conducive to higher servo data sampling rates along with more precise and accurate transducing head operation.

What is claimed is:

1. An apparatus comprising a gimbal flexure mounted to a load beam via a rigid physical connection, the gimbal flexure supporting a transducing head and contacting the load beam via the rigid physical connection, a dimple, a first contact feature, and a second contact feature concurrently, the rigid physical connection, dimple, first contact feature, and second contact feature each being separate and different points of physical contact, the rigid physical connection positioned between the first and second contact features.

2. The apparatus of claim 1, wherein the first contact feature continuously extends from the load beam to the gimbal flexure.

3. The apparatus of claim 1, wherein the first contact feature continuously extends from the gimbal flexure to the load beam.

4. The apparatus of claim 1, wherein the first contact feature comprises a first protrusion extending from the load beam and a second protrusion extending from the gimbal flexure.

5. The apparatus of claim 1, wherein the first contact feature is positioned symmetrically about a longitudinal axis of the load beam.

6. The apparatus of claim 1, wherein the load beam comprises the first contact feature and the second contact feature, the second contact feature being physically separated from the first contact feature on the load beam.

7. The apparatus of claim 1, wherein the second contact feature has a different cross-sectional shape than the first contact feature.

8. The apparatus of claim 1, wherein the second contact feature is offset from a longitudinal axis of the load beam.

9. The apparatus of claim 1, wherein the first contact feature is a stamped aspect of the load beam.

10. The apparatus of claim 1, wherein the gimbal flexure comprises a microactuating feature configured to induce lateral transducing head motion.

11. A system comprising a gimbal flexure mounted to a load beam via a physical connection, the gimbal flexure supporting a transducing head and contacting the load beam via the physical connection, a dimple, and a first contact feature concurrently, the physical connection, dimple, and first contact feature each being separate and different points of physical contact, the gimbal flexure having a first compromising feature that weakens the gimbal flexure to increase a first order resonance frequency of the gimbal flexure.

12. The system of claim 11, wherein the first compromising feature is positioned on a strut of the gimbal flexure.

13. The system of claim 12, wherein the first compromising feature comprises at least one notch that reduces a width of the strut.

14. The system of claim 11, wherein the gimbal flexure comprises a second compromising feature.

15. The system of claim 14, wherein the second compromising feature is physically separated from, and aligned with, the first compromising feature along a transverse axis of the load beam.

16. The system of claim 14, wherein the second compromising feature has a different number of notches than the first compromising feature.

17. A method comprising:
  mounting a gimbal flexure to a load beam via a physical connection, the gimbal flexure supporting a transducing head
  contacting the load beam to the gimbal flexure via the physical connection, a dimple, and a first contact feature concurrently, the physical connection, dimple, and contact feature each being separate and different points of physical contact, the gimbal flexure having a first compromising feature that weakens the gimbal flexure to increase a first order resonance frequency of the gimbal flexure; and
  accessing data on a data storage medium adjacent to the transducing head while the load beam contacts the gimbal flexure with each of the physical connection, dimple, and contact feature to increase a first order resonance frequency of the gimbal flexure.

18. The method of claim 17, wherein at least one contact insert is installed between the load beam and gimbal flexure at the contact feature.

19. The method of claim 17, wherein a microactuating feature of the gimbal flexure is activated without inducing resonance in the gimbal flexure.

20. The method of claim 17, wherein the contact feature increases the first order resonance frequency of the gimbal flexure to greater than 50 kHz.

* * * * *